United States Patent [19]
Gerard

[11] Patent Number: 5,765,631
[45] Date of Patent: Jun. 16, 1998

[54] FLUID CIRCULATION APPARATUS

[75] Inventor: Claude Gerard, Chantraine, France

[73] Assignees: L'Air Liquide, Societe Anonyme Pour l'Etude et l'Exploitation des Procedes Georges Claude, Paris Cedex; Nordon Cryogenie SNC, Golbey, both of France

[21] Appl. No.: 575,476

[22] Filed: Dec. 20, 1995

[30] Foreign Application Priority Data

Dec. 21, 1994 [FR] France ................. 94 15 423

[51] Int. Cl.⁶ ........................................ F28F 3/00
[52] U.S. Cl. ............... 165/166; 165/111; 165/DIG. 183; 165/911; 96/185
[58] Field of Search ............... 165/166, 111, 165/911, DIG. 138, DIG. 183; 96/185, 218

[56] References Cited

U.S. PATENT DOCUMENTS

| | | | |
|---|---|---|---|
| 3,490,522 | 1/1970 | Bizzarro | 165/166 |
| 3,568,462 | 3/1971 | Hoffman et al. | 165/166 X |
| 3,578,073 | 5/1971 | Bosquain | 165/111 |
| 4,773,474 | 9/1988 | Stay | 165/76 |
| 5,324,452 | 6/1994 | Allam et al. | 165/166 X |

FOREIGN PATENT DOCUMENTS

| | | | |
|---|---|---|---|
| 0 566 435 | 10/1993 | European Pat. Off. | |
| 2 665 757 | 2/1992 | France | |
| 1 901 475 | 8/1970 | Germany | |
| 0113298 | 5/1988 | Japan | 165/166 |

Primary Examiner—Denise L. Ferensic
Assistant Examiner—Christopher Atkinson
Attorney, Agent, or Firm—Young & Thompson

[57] ABSTRACT

A fluid circulation apparatus comprises a body part (2) in the shape of a dihedron with, on a first face of the dihedron, at least one opening for input/output of this fluid covering over the opening in a leaktight way. The bulb projects with respect to the body part (2) beyond the edge (13) of the dihedron and is produced by combination of metal sheets, of cylindrical, spherical and/or ellipsoidal shape, welded to one another. The apparatus is applicable to the integration of phase separators with heat exchangers of the brazed-plate type or alternatively to the input/output of fluids in such exchangers.

19 Claims, 7 Drawing Sheets

FLUID CIRCULATION APPARATUS

FIELD OF THE INVENTION

The present invention relates to a fluid circulation apparatus of the type comprising, on the one hand, a body part in the shape of a dihedron with, on a first face of the dihedron, at least one opening for input/output of a fluid and, on the other hand, a bulb for input/output of this fluid covering over the opening in a leaktight way.

The invention applies in particular to heat exchangers, of the thermosiphon type or of the falling-film type, treating at least one two-phase fluid, such as the evaporators/condensers of air-distillation plants, the evaporators of refrigeration units or the reboilers of distillation columns, or alternatively to certain exchangers placed in confined spaces, such as the interstage exchangers of certain compressors.

BACKGROUND OF THE INVENTION

In the first above application, it is often necessary, for reasons of safety, to avoid evaporating the evaporators/condensers in question to dryness. For this reason, the evaporated product, for example bottom oxygen from the low pressure column of an air distillation double-column, exits from the exchanger in the two-phase state and must therefore pass through the phase separator which removes the droplets from the gas phase and makes it possible to recycle the liquid.

In the conventional technology of these heat exchangers, the two-phase fluid, in order to be separated into its two phases, is collected by means of an output box of general semi-cylindrical shape and is conveyed, via a pipe, to a separate bulb of the exchanger. This solution involves, for the manufacture of the exchanger, a number of relatively difficult welding operations and results in a relatively complex, bulky and expensive structure.

Likewise, in the second above application, the exchanger body generally contains semi-cylindrical boxes for input/output of fluids as its two ends, which makes it complicated to connect these boxes to the other constituents of the compressor and renders the combined apparatus bulky.

SUMMARY OF THE INVENTION

The aim of the invention is simplify the construction of heat exchangers of the abovementioned type. To this end, the subject of the invention is a heat exchanger of this type, characterized in that the bulb projects, with respect to the said body part, beyond the edge of the dihedron and is produced by a combination of metal sheets, of cylindrical, spherical and/or ellipsoidal shape, welded to one another.

The heat exchanger according to the invention can contain one or a number of the following characteristics:

- the body part forming a second dihedron between the first face and a third adjacent face, the bulb also projects, with respect to the body part, beyond the edge of the second dihedron;
- the bulb spans the edge of the or of each dihedron and is connected with a leaktight joint to each of the faces of the or of each dihedron;
- the body part being formed by a stack of parallel plates defining between them flat passages, by corrugated spacers arranged between these plates and by bars for sealing off the passages, the bars corresponding to the fluid leaving the said opening free, the bulb is connected to the said body part only on faces of this part which are formed by end portions of plates or by bars;
- the bulb is connected to the first face along two lines perpendicular to the edge of the or of each dihedron, in particular along the two rims of this face perpendicular to the edge;
- the bulb consists of three cylindrical metal sheets, the two end metal sheets having axes which perpendicularly cut the axis of the central metal sheet;
- the apparatus constituting a heat exchanger in which the body part is parallelepipedal with the first face at its upper or lower end, the fluid being a two-phase fluid which exits from this body part via the opening, the bulb contains a liquid outlet in the region of its bottom point and a gas outlet in the region of its top point;
- the first face being the upper face of the body part, the liquid outlet is connected to a liquid inlet situated at a lower level of the body part
- the bulb also covers over the lower face of the body part, which face is provided with the liquid inlet.

BRIEF DESCRIPTION OF THE DRAWINGS

Implementational examples of the invention will now be described with regard to the appended drawings, in which.

DETAILED DESCRIPTION OF THE INVENTION

Figure 1:
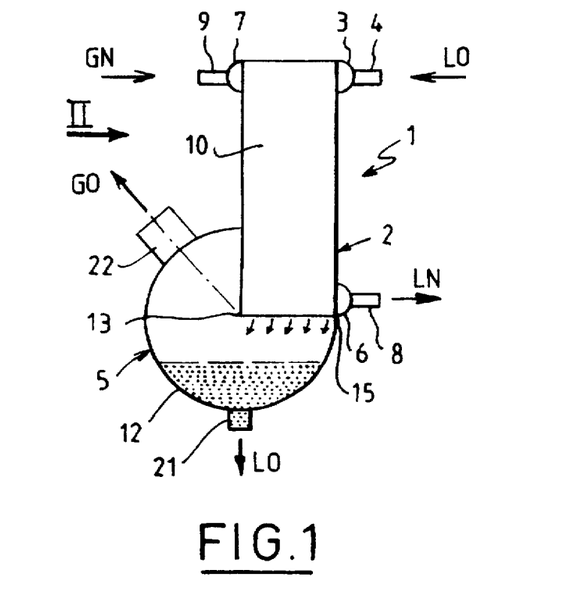
FIG. 1 is a diagrammatic side view of a heat exchanger in accordance with the invention, according to a first embodiment.
Figure 2:
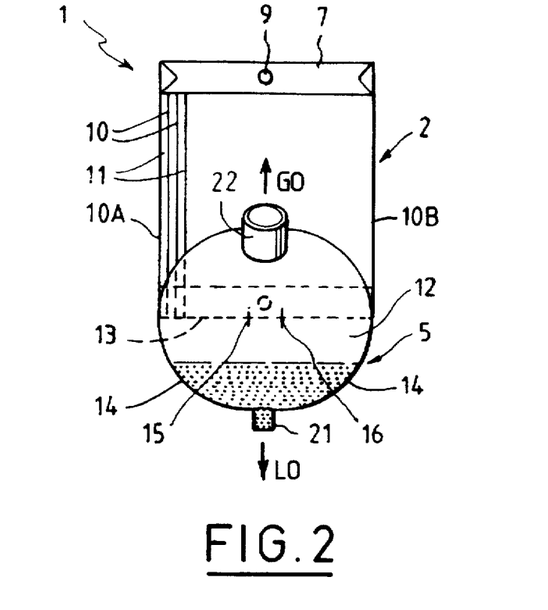
FIG. 2 is a view of the same exchanger taken by looking along the arrow II of FIG. 1.
Figure 3:
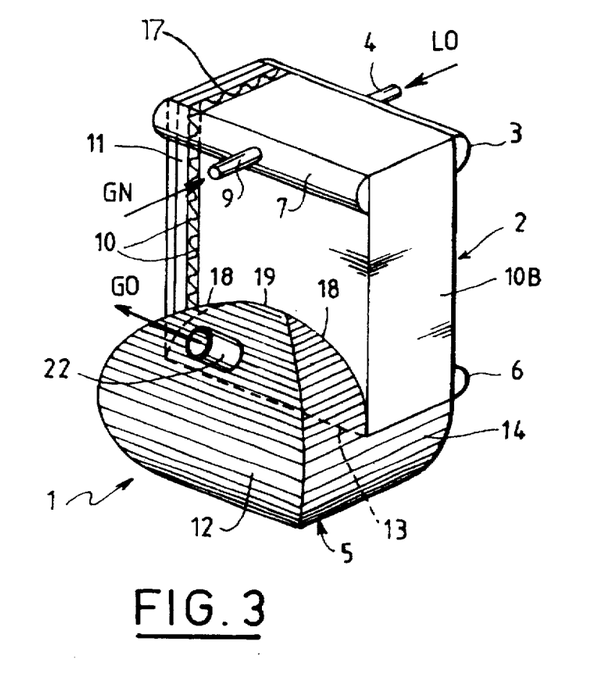
FIG. 3 represents the same exchanger in perspective.

The heat exchanger 1 shown diagrammatically in FIGS. 1 to 3 is, for example, the main evaporator/condenser of an air distillation double-column, of the falling-film type, intended to partially evaporate liquid oxygen at atmospheric pressure by condensation of nitrogen at a pressure of the order of 5 to 6 bars absolute. An example of such an evaporator/condenser is described in EP-A-0.130.122.

The exchanger 1 comprises an exchanger body 2 of parallelepipedal shape, elongate in the vertical direction, equipped with various fittings. As regards a specific fluid, known as a "treated fluid", circulating in the exchanger and undergoing partial evaporation or condensation in the body 2, that is to say, in the example under consideration, partially evaporated liquid oxygen, these fittings consist of au inlet box 3, connected to a pipe 4 for feeding with single-phase treated fluid, and a bulb 5 for separating the exiting two-phase fluid into its liquid and vapour phases. A box 6 and a box 7, which are used respectively for the output and the input of an auxiliary fluid (in this example nitrogen) and which are connected respectively to pipes 8 and 9, are also provided on the body 2.

More particularly, the body 2 consists of a stack of vertical and parallel rectangular plates 10 between which are interposed corrugated spacers 17, which also form thermal fins. Each pair of plates 10 defines a passage of generally flat shape. At least two series of passages exist, one of which is reserved for the circulation of the treated fluid while the other serves to circulate the auxiliary fluid.

On their periphery, the passages are sealed off by bars 11. The bare corresponding to the treated fluid, however, leave free, on one side and at the top of the body 2, a row of inlet windows for this fluid covered over by the box 3. Moreover, the bars 11 corresponding to the same fluid are eliminated over the whole of the lower face of the body 2.

As regards the auxiliary fluid, the bars 11 leave free a range of inlet windows on the sane side as the box 3 but at the bottom of the body 2, these windows being covered over by the box 6. They also leave free, on the other side and at the top of the body 2, a row of outlet windows covered over by the box 7.

The body 2 is produced by stacking plates, spacers and bars, and oven brazing in a single step. The inlet/outlet boxes 3, 6, 7 have a general semicylindrical shape. They are attached to the body 2 by welding, as is the bulb 5, which will now be described.

The bulb 5 is produced by welded assembly of three circular-based cylindrical metal sheets: on the one hand, a central metal sheet 12, the axis of which is coincident with the horizontal intersection 13 of the lower face of the body 2 with the vertical face of this body which is opposite the boxes 3 and 6, the radius of this metal sheet being equal to the width W of the plates 10 (FIG. 1) and, on the other hand, two side metal sheets 14, also of radius W, with axes 15, 16 perpendicularly cutting the intersection 13 and tangential, in their diametrical plane, to the bottom end of the two end plates 10A, 10B (FIG. 2). As seen in FIGS. 1 and 3, each metal sheet 14 extends, at each level, between its two points of intersection with the central metal sheet 12, which starts from the horizontal edge 15 of the body 2 which is opposite the edge 13 and ends on the vertical face which is opposite this body.

A bulb 5 is thus obtained which has a wide opening made as a single piece, the rim of which is defined as follows: a U-shaped outline which follows three consecutive sides of the base of the body 2, namely the lower rime of the two end plates 10A, 10B and the edge 15, which consists of rims of the plates and of bars 11, and a curvilinear outline which joins up with the ends of the U and which consists (FIG. 3) of two circular arcs 18 connected by a straight segment 19. The U-shaped outline is welded along the three corresponding edges of the body 2 and the curvilinear outline is welded to the adjacent vertical face 20, which consists of end portions of the plates 10 and of bars 11. The face 20 will subsequently be denoted by "front face" in order to simplify the description.

It is understood that the passages freely emerge, at their base, in the bulb 5, which serves as phase separator and extends beyond the body 2 towards the bottom and towards the front. The liquid oxygen collected is discharged via an outlet orifice 21 situated at the bottom point of the bulb and the gaseous oxygen is discharged via an outlet orifice 22 provided in the region of its top point.

Figure 4:
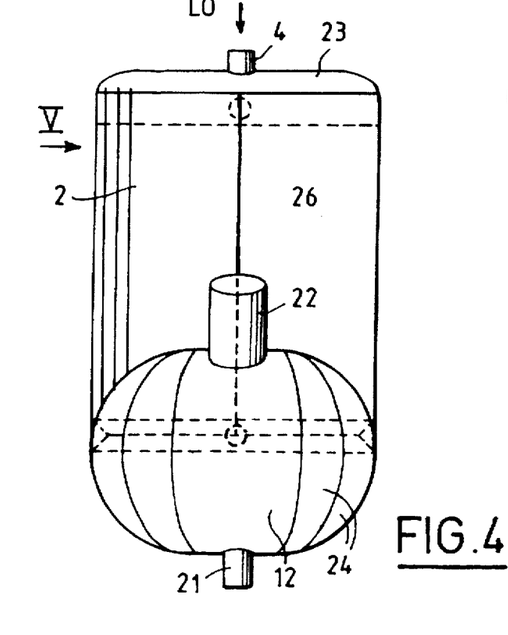
FIG. 4 is a view similar to FIG. 2 of an alternative form of the same exchanger.
Figure 5:
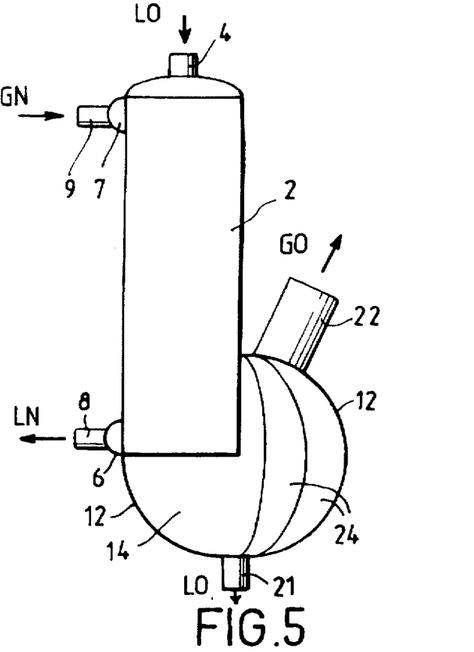
FIG. 5 is a view taken along the arrow V of FIG. 4.
Figures 6, 8:
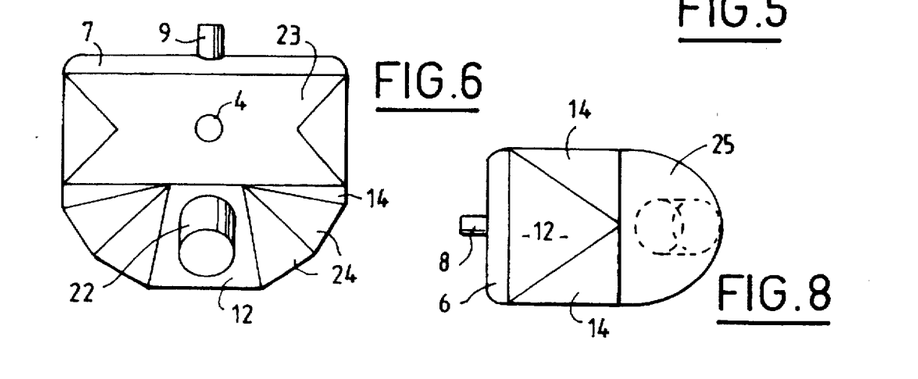
FIG. 6 is a plan view of the exchanger of FIG. 4.
FIG. 8 is a bottom view of the exchanger of FIG. 7.

The alternative form of FIGS. 4 to 6 differs from the above only in two respects:

on the one hand, the liquid oxygen is introduced at the top of the body 2 via an inlet box 23 which covers over the whole of the upper face of this body;

on the other hand, the change from the side metal sheets 14 to the central metal sheet 12 is carried out in a number of stages, by means of a number of intermediate metal sheets 24 of cylindrical sectors angularly offset, in the form of citrus fruit segments, with respect to one another, in the manner of an elbow of a pipe. In the example shown, there are, on each side, two intermediate metal sheets 24 with an angle of 30° between the consecutive metal sheets.

Figure 7:
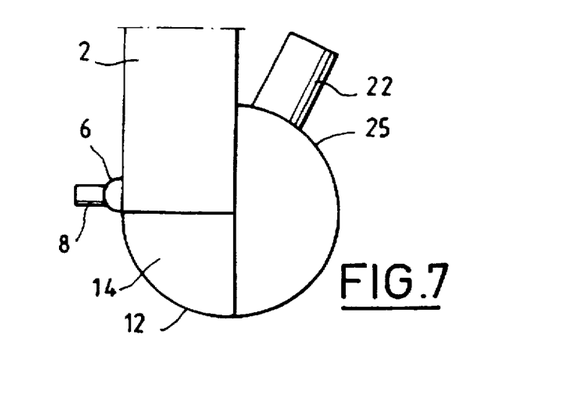
FIG. 7 is a partial view, similar to FIG. 1, of another alternative form of the same exchanger.

Increasing the number of intermediate metal sheets to infinity results in the arrangement in FIGS. 7 and 8 where, on each side, the combination of the metal sheets 14 and 24 is replaced by a quarter of a sphere. Moreover, in FIGS. 7 and 8, the centres of the two quarters of a sphere have been made coincident, consequently eliminating one side of the central cylindrical metal sheet 12, so that the part of the bulb projecting sideways is a hemi-sphere 25.

This alternative form is particularly well suited to the case of a simple exchanger body, with a relatively slight thickness, whereas the presence of the metal sheet 12 makes it possible to adapt at will to multiple exchanger bodies welded to one another side by side, as shown diagrammatically in FIG. 4 by the vertical weld 26, which corresponds to a double-body heat exchanger.

In the examples in FIGS. 4 to 8, as in FIGS. 1 to 3, the part of the bulb situated under the body 2 consists of three cylindrical metal sheets 12, 14 with axes perpendicular to one another, welded to one another along the intersections of the cylinders, which form a V in plan view (FIG. 8). Such a configuration will subsequently be denoted by a "half-dome" shape.

All the embodiments described until now are capable of being used not only, as is the case for falling-film evaporators/condensers, when the two-phase fluid is substantially at atmospheric pressure but also when this fluid is pressurized. In fact, the shape, domed in all directions, of the bulb makes it capable of supporting an internal pressure and, moreover, its bonding with the exchanger body is entirely produced on end portions of plates 10 and on bars 11, so that the pull exerted on the body due to the internal pressure of the bulb is never exerted on the end plates 10A, 10B.

Figure 9:
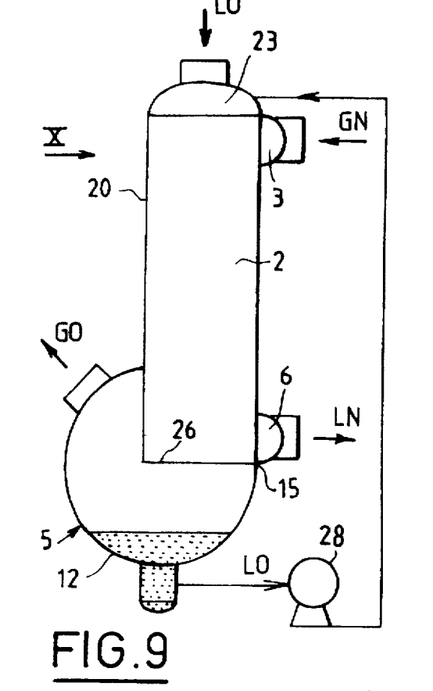
FIG. 9 is a view similar to FIG. 1 of another variant of the same exchanger.
Figure 10:
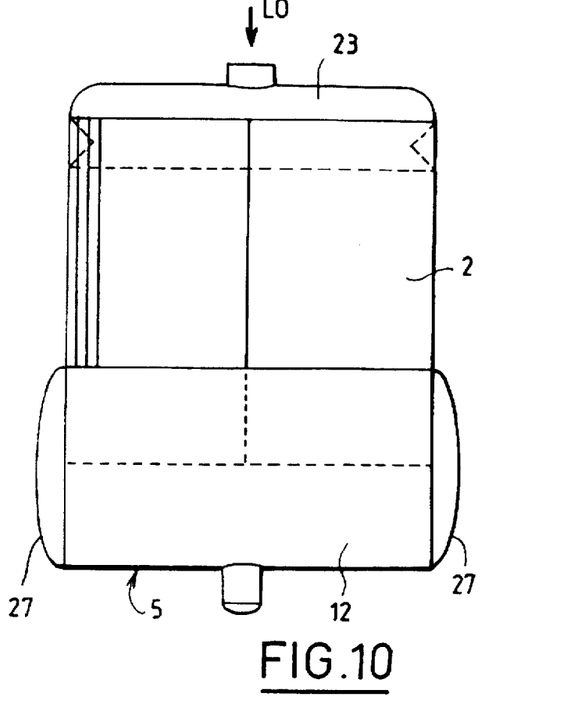
FIG. 10 is a view taken along the arrow X of FIG. 9.

On the other hand, for applications where the two-phase fluid is at atmospheric pressure, the bulb can be fixed to the plates 10A, 10B and a simpler structure can be adopted for the bulb. Thus, in the example of FIGS. 9 and 10, a simple cylindrical metal sheet 12 with a horizontal axis 26 is used, the cylinder being truncated to its horizontal diametrical plane by the body 2 and extending from the plate 10A to the plate 101. This metal sheet is welded along the rear lower rim 15 of the body 2 and to the front face 20 of the latter. The bulb in sealed off at each end of the metal sheet 12 by an end plate 27 of semi-elliptical axial section welded to the end portion of the metal sheet 12 and to the corresponding plates 10A or 10B. The pump 28 for returning the liquid oxygen collected in the bulb 5 is also shown in FIG. 9, it also being possible for this pump to be used in each of the embodiments described above.

FIGS. 11 to 16 represent other possible configurations for the bulb 5 which can be used with a two-phase fluid at atmospheric pressure or under pressure. All these alternative forms have in common a part 29 of half-dome shape situated under the rear part of the body 2 over the entire thickness of the latter.

Figure 11:
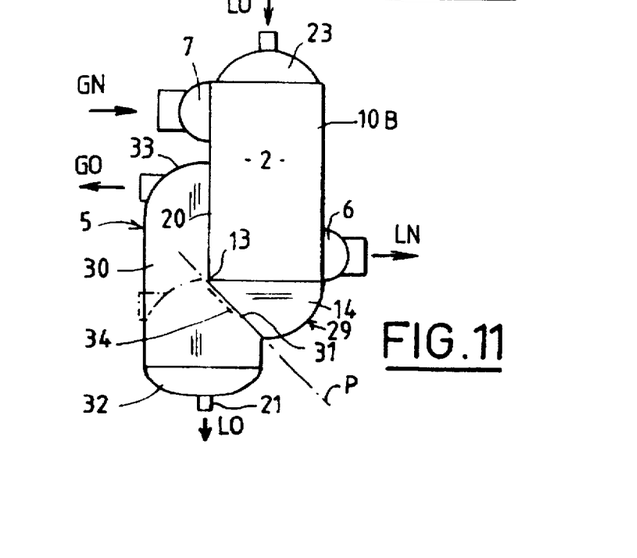
FIG. 11 is a view similar to FIG. 1 of another alternative form of the same exchanger.
Figure 12:
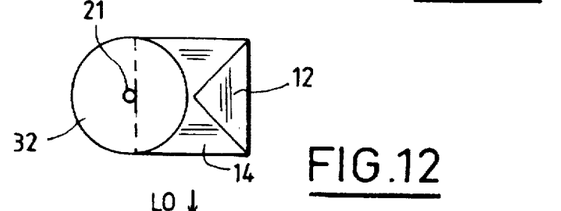
FIG. 12 is a bottom view of the exchanger of FIG. 11.

In the case of FIGS. 11 and 12, the side metal sheets 14 of the half-dome are extended towards the front and the bulb contains a cylinder 30 with a vertical axis which cuts the above along the curve 31 which curve is in the plane P which passes through the edge 13 and is inclined towards the bottom and towards the rear at 45°. Above the edge 13, the half of the cylinder 30 is truncated by the body 2. An end plate of semi-elliptical section 32 is welded to the lower end of the cylinder 30, which end is at a lower level than the metal sheet 14, whereas the upper end of the cylinder 30 is also truncated by another cylindrical metal sheet 33 with a horizontal axis contained in the face 20 in order to form an upper half-dome. Thus, the combination 29-30-32-33 constituting the bulb 5 is again connected to the body 2 solely along the lower end portions of the plates 10 and on the front face 20.

An alternative form in which the part of the bulb 5 projecting forwards only rises to the level of the edge 13 is also shown in FIG. 11, in a dot-and-dash line. Moreover, a reinforcing plate 34 contained in the plane P can be attached in the bulb, from this edge.

Figure 13:
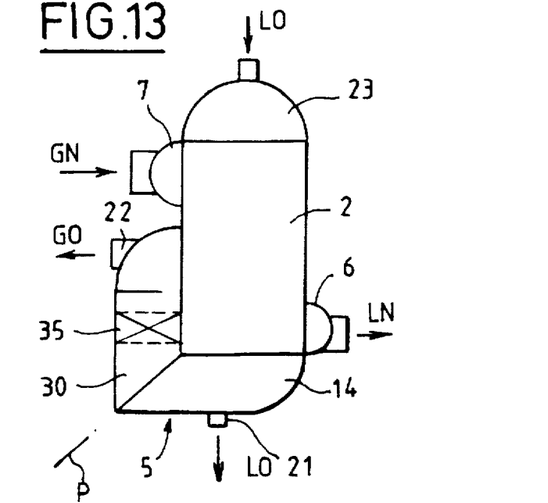
FIG. 13 is a view similar to FIG. 1 of another alternative form of the same exchanger.

The alternative form of FIG. 13 only differs from the above in that the metal sheets 14 of the part 29 are extended into a single half-cylinder towards the front, so that the plane P is inclined towards the bottom and towards the front from the edge 13. An appropriate device 35 for separation of droplets, arranged in the semi-cylindrical part of the cylinder 30, has also been shown.

Figure 14:
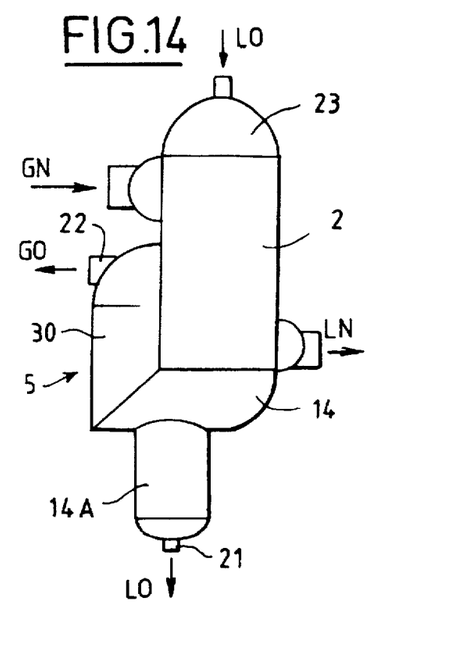
FIG. 14 is a view similar to FIG. 13 of an alternative form.

The alternative form of FIG. 14 moreover comprises a lengthening piece 14A which leaves towards the bottom from the bottom point of the metal sheet 14 and which makes it possible to increase the liquid storage capacity of the bulb.

Figure 15:
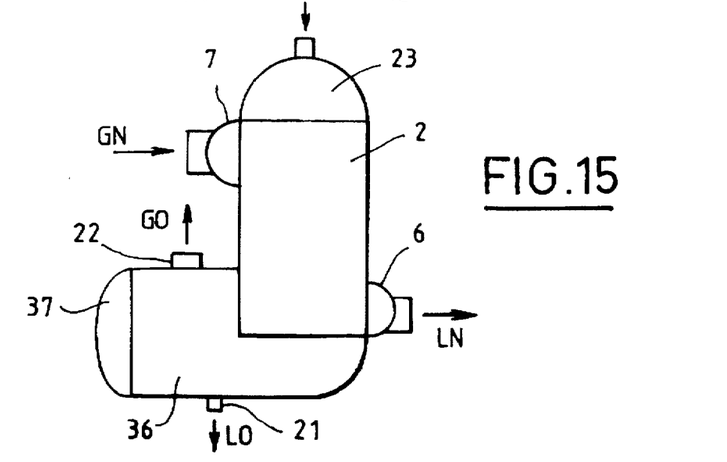
FIG. 15 is a view similar to FIG. 13 of another alternative form.
Figure 16:
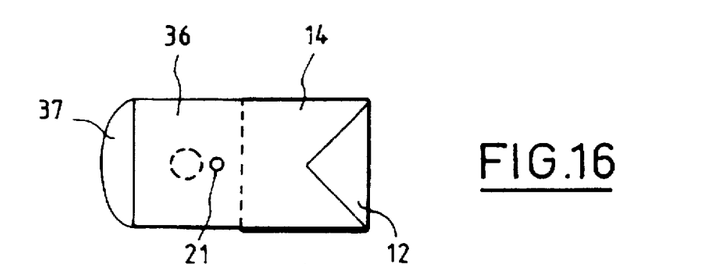
FIG. 16 is a bottom view of the exchanger of FIG. 15.

In the example of FIGS. 15 and 16, the cylinder of the metal sheets 14 is extended into a complete cylinder 36 with a horizontal axis beyond the face 20 and is sealed off at the front by an end plate of semi-elliptical section 37.

FIGS. 17 to 27 represent various embodiments of the invention applied to the case where the two-phase fluid leaves from the upper face 38 of the body 2, for example for a main evaporator/condenser of an air distillation double-column of the thermosiphon type. In each case, the bulb covers over the whole of this face 38 and extends over the front face 20 of the body 2, so as to have a top point and a bottom point situated respectively above and below the face 38. Moreover, in each case, the rim of the bulb is not welded to the end plates 10A, 10B, for the reasons explained above.

Figure 17:
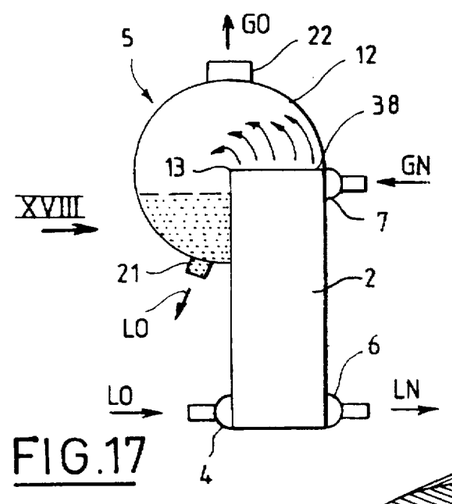
FIGS. 17 to 19 are views respectively similar to FIGS. 2 to 4, FIG. 18 being taken along the arrow XVIII of FIG. 17, these views corresponding to another embodiment of the heat exchanger according to the invention.
Figure 18:
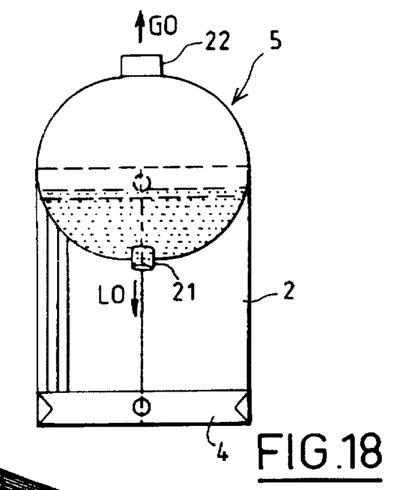
Figure 19:
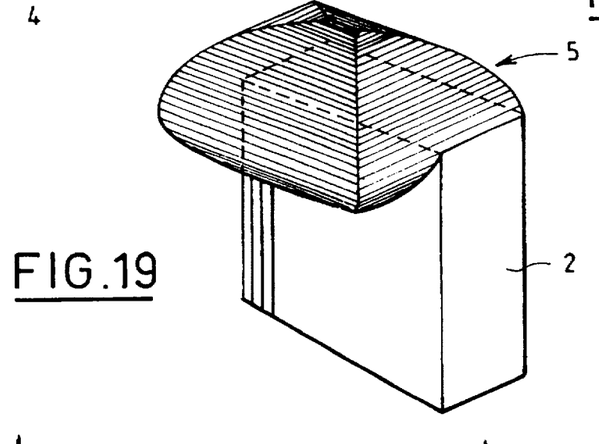

The embodiment of FIGS. 17 to 19 is obtained by simply reversing that of FIGS. 1 to 3. However, it should be noted that, in the evaporators/condensers in question, nitrogen is condensed countercurrentwise to oxygen and thus in the descending direction of the exchanger. FIG. 19 has been simplified so that only the configuration of the body 2 and of the bulb 5 appear.

Figure 20:
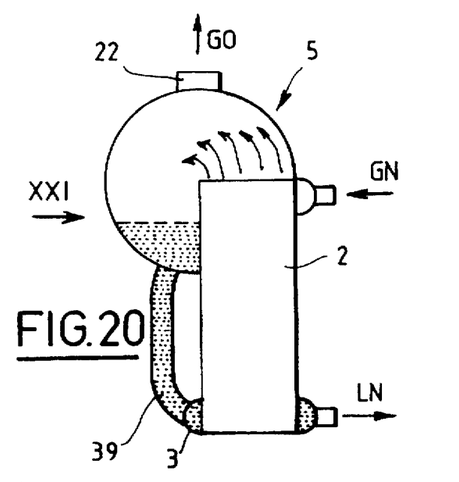
FIG. 20 is a view similar to FIG. 17, showing the application of the invention to an evaporator/condenser of the thermosiphon type.
Figure 21:
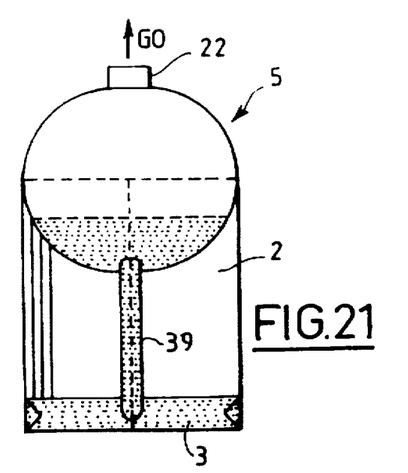
FIG. 21 is a view taken along the arrow XXI of FIG. 20.

In the alternative form of FIGS. 20 and 21, a pipe 39 has simply been added, which pipe leaves from the orifice 21 and is used for returning the liquid oxygen collected in the bulb 5 to the box 3 for input of liquid oxygen into the exchanger body.

Figure 22:
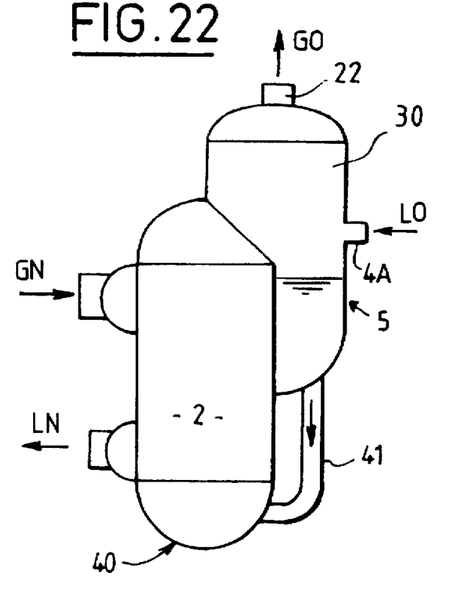
FIG. 22 is a view similar to FIG. 20 of an alternative form.

Likewise, the alternative form of FIG. 22 is essentially obtained by reversing that of FIGS. 11 and 12, the liquid oxygen collected in the bottom part of the bulb being returned into a lower dome 40 of the exchanger, welded to the perimeter of the lower face of the body 2, via a pipe 41.

Figure 23:
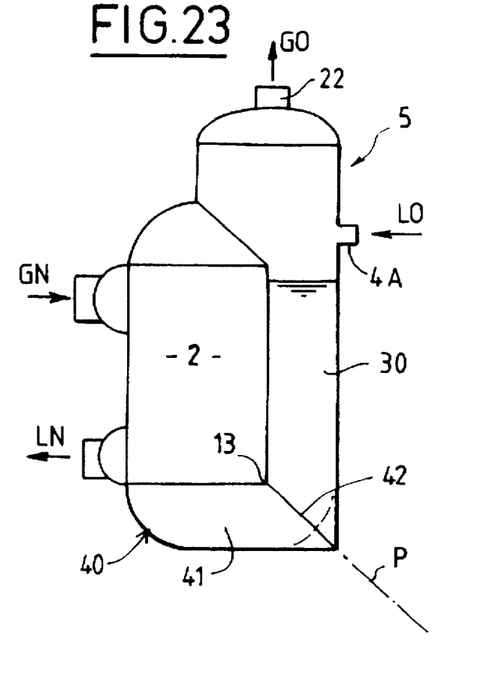
FIG. 23 is a similar view of another alternative form.

In the alternative form of FIG. 23, the half-cylinder 30 of the bulb is extended towards the bottom until it cuts the semi-cylindrical extension towards the front of the side metal sheets 41 of the dome 40. The intersection 42 is in a plane P inclined towards the front and towards the bottom from the edge 13. Thus, a single space of large section covers over the whole of the upper, front and lower faces of the body 2.

In the arrangements of FIGS. 22 and 23, the liquid oxygen to be evaporated is introduced into the bulb 5 via a pipe 4A.

As indicated in dot-and-dash lines in FIG. 23, the change from the semi-cylinder 30 to the semi-cylinder 41 can be gradual, for example rounded.

Figure 24:
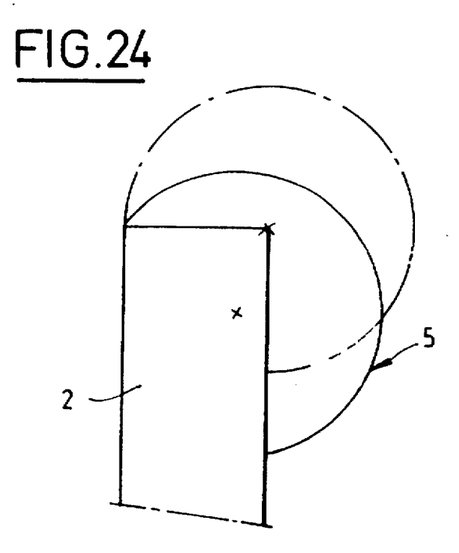
FIGS. 24 to 27 are diagrammatic partial side views illustrating possible modifications of the heat exchangers according to the invention.
Figure 25:
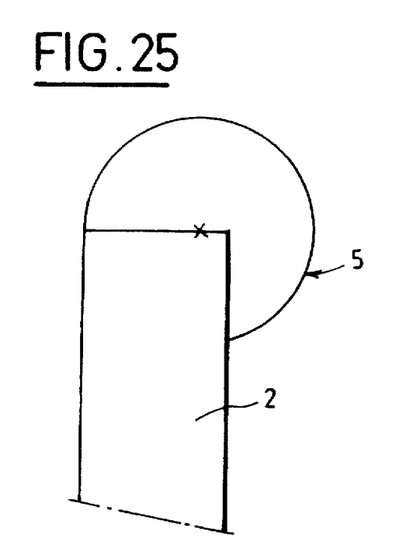
Figure 26:
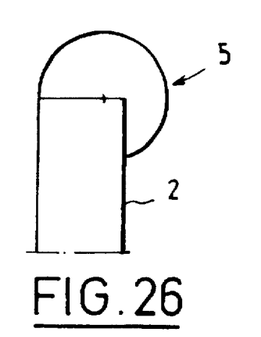
Figure 27:
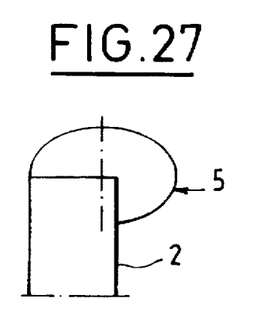
Figure 28:
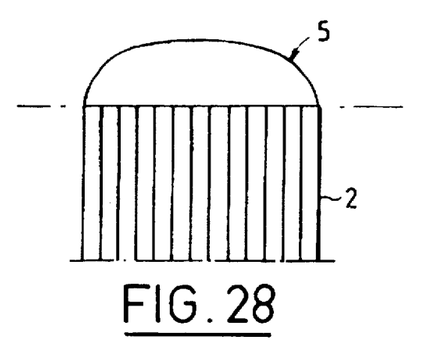
FIGS. 28 and 29 are front views corresponding respectively to FIGS. 26 and 27.
Figure 29:
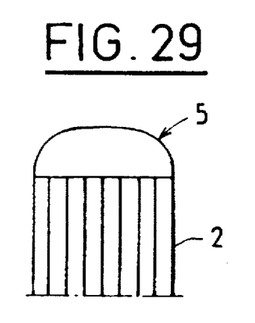

FIGS. 24 to 31 illustrate ways in which the shapes described above can be modified: from the shape of FIGS. 17 to 19, recalled in dot-and-dash lines in FIG. 24, the centre of the cylinder can be offset, in side view, towards the bottom and towards the rear (FIG. 24) or else horizontally and towards the rear (FIG. 25). These modifications make it possible to change the total spatial requirement and liquid storage capacity in each specific application.

Moreover, as illustrated in FIGS. 26 to 29, all these shapes can be deformed by horizontal or vertical affinity in one direction or the other, which transforms the circular cylinders into elliptical cylinders and the spheres into ellipsoids.

Figure 30:
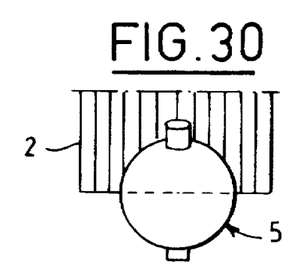
FIG. 30 is a partial view similar to FIG. 2 illustrating an alternative form of this FIG. 2.
Figure 31:
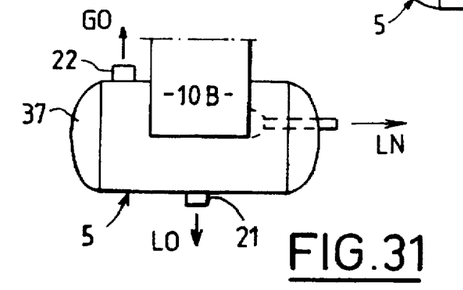
FIG. 31 is a partial view similar to FIG. 15 illustrating an alternative form of this FIG. 15.

Moreover, the width of the bulb 5 can be less than the thickness of the body 2 (FIG. 30) and/or the bulb 5 can extend beyond this body, both towards the front and towards the rear (FIG. 31).

Figure 32:
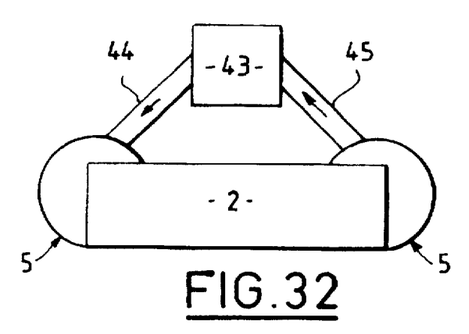
FIG. 32 diagrammatically illustrates another application of the invention.

FIG. 32 shows how the invention can advantageously be used in contexts other than the treatment of two-phase fluids: a heat exchanger body 2, again of the brazed-plate type, is intended to heat or to cool a single-phase fluid arriving from an apparatus 43, for example from a compressor stage, via a pipe 44 and returning to this apparatus (or to another apparatus) via a pipe 45. By virtue of the shape of the bulb 5 provided at each end of the body 2, this bulb projecting laterally, connection of the pipes 44 and 45 is greatly facilitated and the combined unit has a reduced spatial requirement. This of course applies to the case where just one end of the body 2 would be equipped with a bulb 5.

I claim:

1. Fluid circulation apparatus comprising a body part and a bulb, said body part comprising a stack of parallel plates defining between them flat passages, corrugated spacers arranged between said plates, and bars sealing off end portions of said passages;

said body part defining a first face and a second face which intersect along a first edge, each said first and second face consisting of respective first and second end portions of said plates and of respective first and second said bars;

said first face comprising at least one opening for input/output of a fluid, said opening being left free by said first bars;

said bulb covering over said opening in a leaktight way, said bulb projecting, with respect to said body part, beyond said first edge and having a continuous bulb opening which spans said first edge, said bulb consisting of a combination of at least two metal sheets of cylindrical, spherical and/or ellipsoidal shape, said sheets being welded to one another;

said continuous bulb opening being defined by a continuous bulb opening edge which is entirely welded to said first and second faces.

2. Apparatus according to claim 1, wherein the bulb consists of three cylindrical metal sheets comprised of two end metal sheets and a central metal sheet, said two end metal sheets having axes which perpendicularly cut an axis of said central metal sheet.

3. Apparatus according to claim 1, constituting a heat exchanger in which said body part is parallelepidedal with said first face at an upper or lower end thereof, said fluid being a two-phase fluid which exits from said body part via said opening, the bulb comprising a liquid outlet in a region of a bottom point thereof and a gas outlet in a region of a top point thereof.

4. Apparatus according to claim 3, in which said first face is an upper face of said body part, said liquid outlet being connected to a liquid inlet situated at a lower level of said body part.

5. Apparatus according to claim 3, wherein the bulb also covers over a lower face of the body part, which lower face is provided with said liquid inlet.

6. Fluid circulation apparatus comprising a body part and a bulb, said body part comprising a stack of parallel plates defining between them flat passages, corrugated spacers arranged between said plates, and bars sealing off end portions of said passages;

said body part defining a first face and a second face which intersect along a first edge, each said first and second face consisting of respective first and second end portions of said plates and of respective first and second said bars;

said first face comprising at least one opening for input/output of a fluid, said opening being left free by said first bars;

said body part comprising a third face opposed to said second face and intersecting said first face along a second edge opposed to said first edge, said third face consisting of third end portions of said plates and of third bars;

said bulb covering over said opening in a leaktight way, said bulb projecting, with respect to said body part, beyond said first and second edges and having a continuous bulb opening which spans said first and second edges;

said bulb consisting of a combination of at least two metal sheets of cylindrical, spherical and/or ellipsoidal shape, said sheets being welded to one another;

said continuous bulb opening being defined by a continuous bulb opening edge which is entirely welded to said first, second and third faces.

7. Apparatus according to claim 6, wherein the bulb consists of three cylindrical metal sheets comprised of two end metal sheets and a central metal sheet, said two end metal sheets having axes which perpendicularly cut an axis of said central metal sheet.

8. Apparatus according to claim 6, constituting a heat exchanger in which said body part is parallelepidedal with said first face at an upper or lower end thereof, said fluid being a two-phase fluid which exits from said body part via said opening, the bulb comprising a liquid outlet in a region of a bottom point thereof and a gas outlet in a region of a top point thereof.

9. Apparatus according to claim 8, in which said first face is an upper face of said body part, said liquid outlet being connected to a liquid inlet situated at a lower level of said body part.

10. Apparatus according to claim 8, wherein the bulb also covers over a lower face of the body part, which lower face is provided with said liquid inlet.

11. Fluid circulation apparatus, comprising a body part in the shape of a first convex dihedron having a first face and a second face which intersect along a first edge, and, on said first face, at least one opening for input/output of a fluid, the apparatus comprising a bulb for input/output of said fluid, said bulb covering over said opening in a leaktight way, said bulb projecting, with respect to said body part, beyond said first edge and having a continuous bulb opening which spans said first edge, said bulb consisting of a combination of at least two metal sheets of cylindrical, spherical and/or ellipsoidal shape, said sheets being welded to one another, a first said sheet having two first edge portions welded to said first face along two respective lines perpendicular to said first edge and at least a second said sheet having a second edge portion welded to said second face.

12. Apparatus as claimed in claim 11, wherein said two lines are two rims of said first face.

13. Apparatus according to claim 11, wherein the bulb consists of three cylindrical metal sheets comprised of two end metal sheets and a central metal sheet, said two end metal sheets having axes which perpendicularly cut an axis of said central metal sheet.

14. Apparatus according to claim 11, constituting a heat exchanger in which said body part is parallelepidedal with said first face at an upper or lower end thereof, said fluid being a two-phase fluid which exits from said body part via said opening, the bulb comprising a liquid outlet in a region of a bottom point thereof and a gas outlet in a region of a top point thereof.

15. Apparatus according to claim 14, in which said first face is an upper face of said body part, said liquid outlet being connected to a liquid inlet situated at a lower level of said body part.

16. Apparatus according to claim 14, wherein the bulb also covers over a lower face of the body part, which lower face is provided with said liquid inlet.

17. Fluid circulation apparatus comprising a body part and a bulb, said body part comprising a stack of parallel plates defining between them flat passages, corrugated spacers arranged between said plates, and bars sealing off end portions of said passages;

said body part defining a first face and a second face which intersect along a first edge, each said first and second face consisting of respective first and second end portions of said plates and of respective first and second said bars;

said first face comprising at least one opening for input/output of a fluid, said opening being left free by said first bars;

said bulb covering over said opening in a leaktight way, said bulb projecting, with respect to said body part, beyond said first edge and having a continuous bulb opening which spans said first edge;

said continuous bulb opening being defined by a continuous bulb opening edge which is entirely welded to said first and second faces.

18. Fluid circulation apparatus comprising a body part and a bulb, said body part comprising a stack of parallel plates defining between them flat passages, corrugated spacers arranged between said plates, and bars sealing off end portions of said passages;

said body part defining a first face and a second face which intersect along a first edge, each said first and second face consisting of respective first and second end portions of said plates and of respective first and second said bars;

said first face comprising at least one opening for input/output of a fluid, said opening being left free by said first bars;

said body part comprising a third face opposed to said second face and intersecting said first face along a second edge opposed to said first edge, said third face consisting of third end portions of said plates and of third bars;

said bulb covering over said opening in a leaktight way, said bulb projecting, with respect to said body part, beyond said first and second edges and having a continuous bulb opening which spans said first and second edges;

said continuous bulb opening being defined by a continuous bulb opening edge which is entirely welded to said first, second and third faces.

19. Main oxygen/nitrogen evaporator-condensor for an air distillation double column, of the falling-film type, comprising a body part in the shape of a first convex dihedron having a first face and a second face which intersect along a first edge, and, on said first face, at least one opening for input/output of a fluid, the apparatus comprising a bulb for input/output of said fluid, said bulb covering over said opening in a leaktight way, said bulb projecting, with respect to said body part, beyond said first edge and having a continuous bulb opening which spans said first edge, said bulb consisting of a cylindrical main sheet having an axis parallel to said first edge and of a same length as said first edge, and of two ellipsoidal end sheets welded partly to respective end faces of said main sheet and partly to opposed end faces of said body part perpendicular to said first edge.

* * * * *

UNITED STATES PATENT AND TRADEMARK OFFICE
CERTIFICATE OF CORRECTION

PATENT NO. : 5,765,631
DATED : June 16, 1998
INVENTOR(S) : Claude GERARD et al.

It is certified that error appears in the above-indentified patent and that said Letters Patent is hereby corrected as shown below:

On the title page, Item [75], add the joint inventor as follows:

--Jean-Yves LEHMAN, Maisons-Alfort, France--.

Signed and Sealed this

First Day of September, 1998

Attest:

BRUCE LEHMAN

*Attesting Officer*  *Commissioner of Patents and Trademarks*